US012681767B2

(12) United States Patent
 Zhu et al.

(10) Patent No.: US 12,681,767 B2
(45) Date of Patent: Jul. 14, 2026

(54) INSTANCE ALLOCATION METHOD, SYSTEM, AND APPARATUS

(71) Applicant: Huawei Cloud Computing Technologies Co., Ltd., Guian (CN)

(72) Inventors: Xuqi Zhu, Beijing (CN); Shuming Jing, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 436 days.

(21) Appl. No.: 18/297,007

(22) Filed: Apr. 7, 2023

(65) Prior Publication Data

US 2023/0273831 A1 Aug. 31, 2023

Related U.S. Application Data

(63) Continuation of application No. PCT/CN2021/125888, filed on Oct. 22, 2021.

(30) Foreign Application Priority Data

Oct. 22, 2020 (CN) .......................... 202011140553.9
May 18, 2021 (CN) .......................... 202110541043.0

(51) Int. Cl.
 *G06F 9/50* (2006.01)
(52) U.S. Cl.
 CPC .................................. *G06F 9/5044* (2013.01)
(58) Field of Classification Search
 CPC .................................................... G06F 9/5044
 USPC ......................................................... 718/104
 See application file for complete search history.

(56) References Cited

U.S. PATENT DOCUMENTS

| | | | | |
|---|---|---|---|---|
| 5,924,097 A | * | 7/1999 | Hill ....................... | G06F 9/5027 |
| | | | | 707/703 |
| 9,479,382 B1 | | 10/2016 | Ward, Jr. | |
| 10,057,187 B1 | * | 8/2018 | Dhoolam .............. | G06F 3/0605 |
| 10,163,152 B1 | | 12/2018 | Ward, Jr. et al. | |
| 2004/0215780 A1 | * | 10/2004 | Kawato ................... | H04L 67/10 |
| | | | | 709/226 |
| 2014/0237477 A1 | * | 8/2014 | Cadambi ............... | G06F 9/5044 |
| | | | | 718/103 |
| 2015/0081912 A1 | * | 3/2015 | Tan ..................... | H04L 67/1038 |
| | | | | 709/226 |
| 2018/0314718 A1 | | 11/2018 | Fernandez et al. | |
| 2019/0207869 A1 | * | 7/2019 | Wise ..................... | G06F 9/5027 |
| 2020/0301723 A1 | | 9/2020 | Gabrielson et al. | |

FOREIGN PATENT DOCUMENTS

| | | |
|---|---|---|
| CN | 102073814 A | 5/2011 |
| CN | 102117468 A | 7/2011 |
| CN | 104407925 A | 3/2015 |

(Continued)

*Primary Examiner* — Charlie Sun

(57) ABSTRACT

In a method performed by cloud computing management system for instance allocation, the system receives an instance allocation request uploaded by a tenant. The instance allocation request includes a processor resource requirement. Based on the instance allocation request, the system generates an instance allocation solution which includes a life cycle of an instance allocated to the tenant. The system then allocates, based on the instance allocation solution, the instance to the tenant from a cloud computing resource pool managed by the cloud computing management system.

20 Claims, 11 Drawing Sheets

(56)　　　　　　　References Cited

FOREIGN PATENT DOCUMENTS

| CN | 105335207 | A | 2/2016 |
| CN | 106453146 | A | 2/2017 |
| CN | 107743611 | A | 2/2018 |
| CN | 108429704 | A | 8/2018 |

* cited by examiner $$\begin{bmatrix} S_{11} & \cdots & S_{1n} \\ \vdots & \ddots & \vdots \\ S_{m1} & \cdots & S_{mn} \end{bmatrix}$$

FIG. 4A $$\begin{bmatrix} 6 & \cdots & 7 \\ \vdots & \ddots & \vdots \\ 9 & \cdots & 4 \end{bmatrix}$$

FIG. 4B

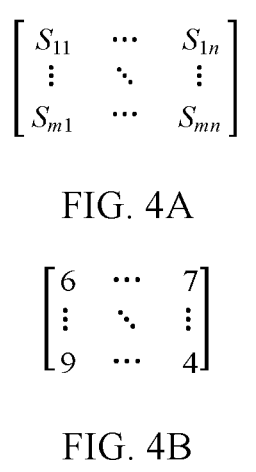

INSTANCE ALLOCATION METHOD, SYSTEM, AND APPARATUS

CROSS-REFERENCE TO RELATED APPLICATIONS

This application is a continuation of International Application PCT/CN2021/125888, filed on Oct. 22, 2021, which claims priority to Chinese Patent Application 202110541043.0, filed on May 18, 2021, and Chinese Patent Application 202011140553.9, filed on Oct. 22, 2020. All of the aforementioned priority applications are hereby incorporated by reference in their entirety.

TECHNICAL FIELD

This application relates to the computer field, and in particular, to an instance allocation method, a system, and an apparatus.

BACKGROUND

A cloud service provider provides tenants with various instances appropriate for different tasks. The instances may be classified into a general-purpose instance, a memory-intensive instance, and a computing-intensive instance based on task types, and an on demand instance and a spot instance based on charging types. A conventional service mode requires the tenants, on a premise that they are clear about task types, to determine types of services to be purchased.

For instance allocation services, how to appropriately use computing resources has become a major concern in the industry.

SUMMARY

This application provides an instance allocation method. The method can improve instance allocation efficiency.

A first aspect of this application provides an instance allocation method, and the allocation method is used in a cloud computing management system. The method includes: receiving an instance allocation request uploaded by a tenant, where the instance allocation request includes a processor resource requirement; generating an instance allocation solution based on the instance allocation request, where the instance allocation solution includes a life cycle of an instance allocated to the tenant; and allocating, based on the instance allocation solution, the instance to the tenant from a cloud computing resource pool managed by the cloud computing management system.

In the instance allocation method, the instance allocation solution is automatically generated, an operation amount of the tenant is reduced, and instance allocation efficiency is improved.

In some possible designs, the instance allocation request uploaded by the tenant does not include the life cycle of the instance, and the life cycle of the instance indicates start time and stop time of the instance.

In some possible designs, the processor resource requirement includes a product of a quantity of processors and duration.

In some possible designs, the instance allocation request further includes any one or more of the following parameters: an instance type, an available area, an instance specification, a minimum quantity of synchronous running instances, shortest valid running time, and a deadline, where the minimum quantity of synchronous running instances indicates a minimum quantity of instances that run simultaneously, the shortest valid running time indicates shortest running time of an instance each time, and the deadline indicates latest time at which running of the instance meets the processor resource requirement.

In some possible designs, the instance allocation solution includes any one or more of the following parameters: an instance type of the instance, an available area in which the instance is located, and an instance specification of the instance, where the instance type of the instance, the available area in which the instance is located, and the instance specification of the instance are determined based on parameters included in the instance allocation request: the instance type, the available area, and the instance specification.

In some possible designs, the method further includes: sending the instance allocation solution to the tenant; and receiving acknowledgment of the tenant for the instance allocation solution.

In some possible designs, the method further includes: determining that the cloud computing resource pool cannot meet the instance allocation request; notifying the tenant to adjust the instance allocation request; and generating the instance allocation solution based on an adjusted instance allocation request.

In some possible designs, the method further includes: generating one or more adjustment solutions, where each adjustment solution indicates to adjust one or more parameters in the instance allocation request; and receiving an adjustment solution selected by the tenant.

In some possible designs, the method further includes: receiving a task uploaded by the tenant; and storing the task in a storage resource in the cloud computing resource pool; and after the allocating, based on the instance allocation solution, the instance to the tenant from a cloud computing resource pool managed by the cloud computing management system, the method further includes: running the stored task on the instance.

In some possible designs, the method further includes: generating the instance allocation solution based on the instance allocation request and a predicted idle state of a computing resource in the cloud computing resource pool, where the predicted idle state of the computing resource indicates a quantity of idle computing resources and idle time of the computing resource in the future.

In some possible designs, the method further includes: allocating the instance to the tenant from the cloud computing resource pool based on the instance allocation solution and a real-time idle state of the computing resource in the cloud computing resource pool, where the real-time idle state of the computing resource indicates a quantity of idle computing resources at a current moment.

A second aspect of this application provides a cloud computing management system. The system includes an interaction module and a processing module. The interaction module receives an instance allocation request uploaded by a tenant, where the instance allocation request includes a processor resource requirement. The processing module generates an instance allocation solution based on the instance allocation request, where the instance allocation solution includes a life cycle of an instance allocated to the tenant; and allocates, based on the instance allocation solution, the instance to the tenant from a cloud computing resource pool managed by the cloud computing management system.

In some possible designs, the instance allocation request uploaded by the tenant does not include the life cycle of the instance, and the life cycle of the instance indicates start time and stop time of the instance.

In some possible designs, the processor resource requirement includes a product of a quantity of processors and duration.

In some possible designs, the instance allocation request further includes any one or more of the following parameters: an instance type, an available area, an instance specification, a minimum quantity of synchronous running instances, shortest valid running time, and a deadline, where the minimum quantity of synchronous running instances indicates a minimum quantity of instances that run simultaneously, shortest valid running time indicates the shortest running time of an instance each time, and the deadline indicates latest time at which running of the instance meets the processor resource requirement.

In some possible designs, the instance allocation solution includes any one or more of the following parameters: an instance type of the instance, an available area in which the instance is located, and an instance specification of the instance, where the instance type of the instance, the available area in which the instance is located, and the instance specification of the instance are determined based on parameters included in the instance allocation request: the instance type, the available area, and the instance specification.

In some possible designs, the interaction module is further configured to: send the instance allocation solution to the tenant; and receive acknowledgment of the tenant for the instance allocation solution.

In some possible designs, the processing module is further configured to: determine that the cloud computing resource pool cannot meet the instance allocation request; notify the tenant to adjust the instance allocation request; and generate the instance allocation solution based on an adjusted instance allocation request.

In some possible designs, the processing module is further configured to: generate one or more adjustment solutions, where each adjustment solution indicates to adjust one or more parameters in the instance allocation request; and the interaction module is configured to receive an adjustment solution selected by the tenant.

In some possible designs, the cloud computing management system further includes a storage module, where the interaction module is configured to receive a task uploaded by the tenant, the storage module is configured to store the task in a storage resource in the cloud computing resource pool, and the processing module is configured to run the stored task on the instance.

In some possible designs, the processing module is further configured to generate the instance allocation solution based on the instance allocation request and a predicted idle state of a computing resource in the cloud computing resource pool, where the predicted idle state of the computing resource indicates a quantity of idle computing resources and idle time of the computing resource in the future.

In some possible designs, the processing module is further configured to allocate the instance to the tenant from the cloud computing resource pool based on the instance allocation solution and a real-time idle state of the computing resource in the cloud computing resource pool, where the real-time idle state of the computing resource indicates a quantity of idle computing resources at a current moment.

A third aspect of this application provides a computing device cluster, including at least one computing device, where each computing device includes a processor and a memory, and a processor in the at least one computing device is configured to execute instructions stored in a memory in the at least one computing device, so that the computing device cluster performs the method provided in any one of the first aspect or the possible designs of the first aspect.

A fourth aspect of this application provides a computer-readable storage medium, including computer program instructions, where when the computer program instructions are executed by a computing device cluster, the computing device cluster performs the method provided in any one of the first aspect or the possible designs of the first aspect.

A fifth aspect of this application provides a computer program product including instructions, where when the instructions are run by a computer device cluster, the computer device cluster is enabled to perform the method provided in any one of the first aspect or the possible designs of the first aspect.

BRIEF DESCRIPTION OF DRAWINGS

To describe the technical methods in embodiments of this application more clearly, the following briefly describes the accompanying drawings used in describing embodiments.

FIG. 4A is a schematic diagram of predicting an idle state of a computing resource according to an embodiment of this application;

FIG. 4B is a schematic diagram of predicting an idle state of a computing resource according to an embodiment of this application;

DESCRIPTION OF EMBODIMENTS

A cloud service provider provides a compute instance service. A compute instance is a computing unit having a computing resource, and the computing unit may run a task of a tenant. A common instance includes a virtual machine, a container, or a bare metal server. The compute instance service provides tenants with various instances appropriate for different types of tasks. The instances may be classified into an on demand instance and a spot instance based on types, and a general-purpose instance, a memory-intensive instance, and a computing-intensive instance based on specifications.

The computing resource includes a resource required for performing a computing operation, for example, a central processing unit (CPU) or graphics processing unit (GPU) resource, a storage resource (memory space), or a network resource.

An instance allocation solution is formulated based on the task of the tenant and a dynamic change status of an idle state of a computing resource of the cloud service provider, to better meet a requirement of the tenant, and more efficiently schedule the computing resource.

This application provides an instance allocation method. A tenant uploads an instance allocation request to a cloud computing management system, and the cloud computing management system predicts an idle state of a computing resource in a future period of time. Further, an instance allocation solution is formulated based on the predicted idle state of the computing resource and the instance allocation request of the tenant, to meet the instance allocation request of the tenant.

Figure 1:
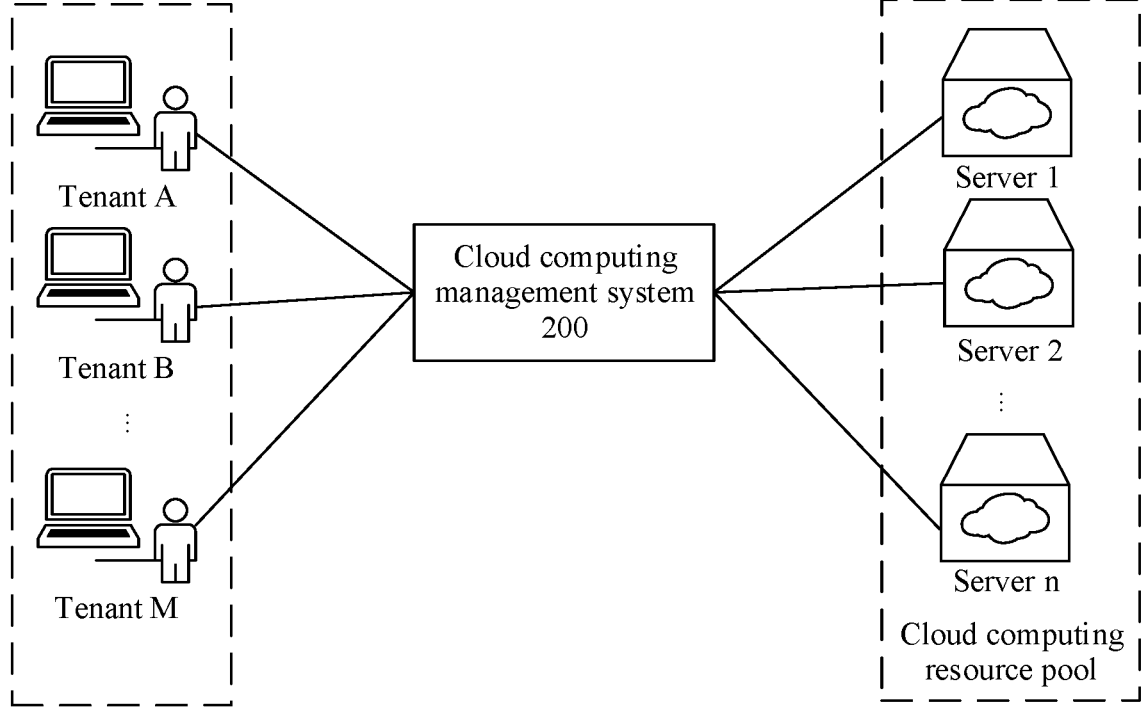
FIG. 1 is a schematic diagram of an application scenario of an instance allocation method according to an embodiment of this application.

To make the technical solutions of this application clearer and easier to understand, the following describes, with reference to FIG. 1, an application scenario of an instance allocation method 100 provided in an embodiment of this application.

As shown in the figure, a cloud computing management system 200 is separately connected to a tenant side and a computing resource pool. The tenant side may include one or more tenants. For example, tenants A to M may be included. The computing resource pool may include one or more computing resources. A server is used as an example, and the computing resource pool may include at least servers 1 to n. Further, the server may be a local server, or may be a cloud server.

Each tenant may upload an instance allocation request to the cloud computing management system 200. Specifically, the tenant may upload the instance allocation request by using a client of the cloud computing management system 200. The client may be deployed on a terminal device on the tenant side.

After receiving the instance allocation request uploaded by the tenant, the cloud computing management system 200 predicts a quantity of idle servers and idle time of each server in the computing resource pool in the future, to obtain a predicted idle state of the server (computing resource) in the cloud computing resource pool. Further, using the instance allocation request uploaded by the tenant and the predicted idle state of the server as constraint conditions, and using an indicator such as a response rate or costs as an optimization target, the cloud computing management system 200 may obtain an optimal solution, namely, an instance allocation solution, by using an optimization method. Specifically, the instance allocation solution indicates time at which an instance of a specific specification is allocated to each tenant and a quantity of instances of each specification. In other words, the instance allocation solution includes a life cycle of an instance allocated to the tenant. The life cycle indicates start time and stop time of the instance. Further, the instances may be run for the tenants on time and quantity based on the instance allocation solution, so as to meet tasks of the tenants.

Figure 2A:
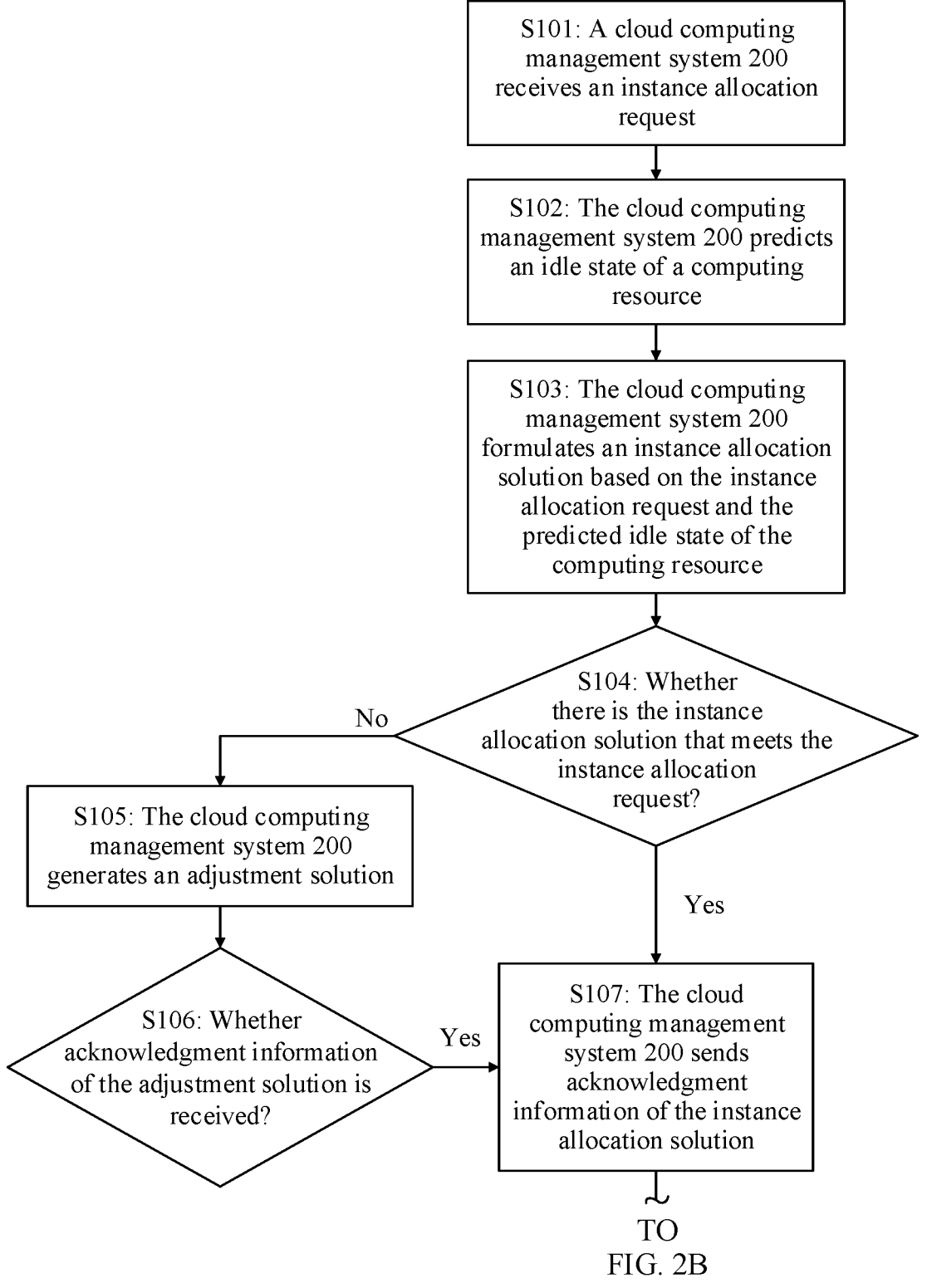
FIG. 2A and FIG. 2B are a flowchart of an instance allocation method according to an embodiment of this application.
Figure 2B:
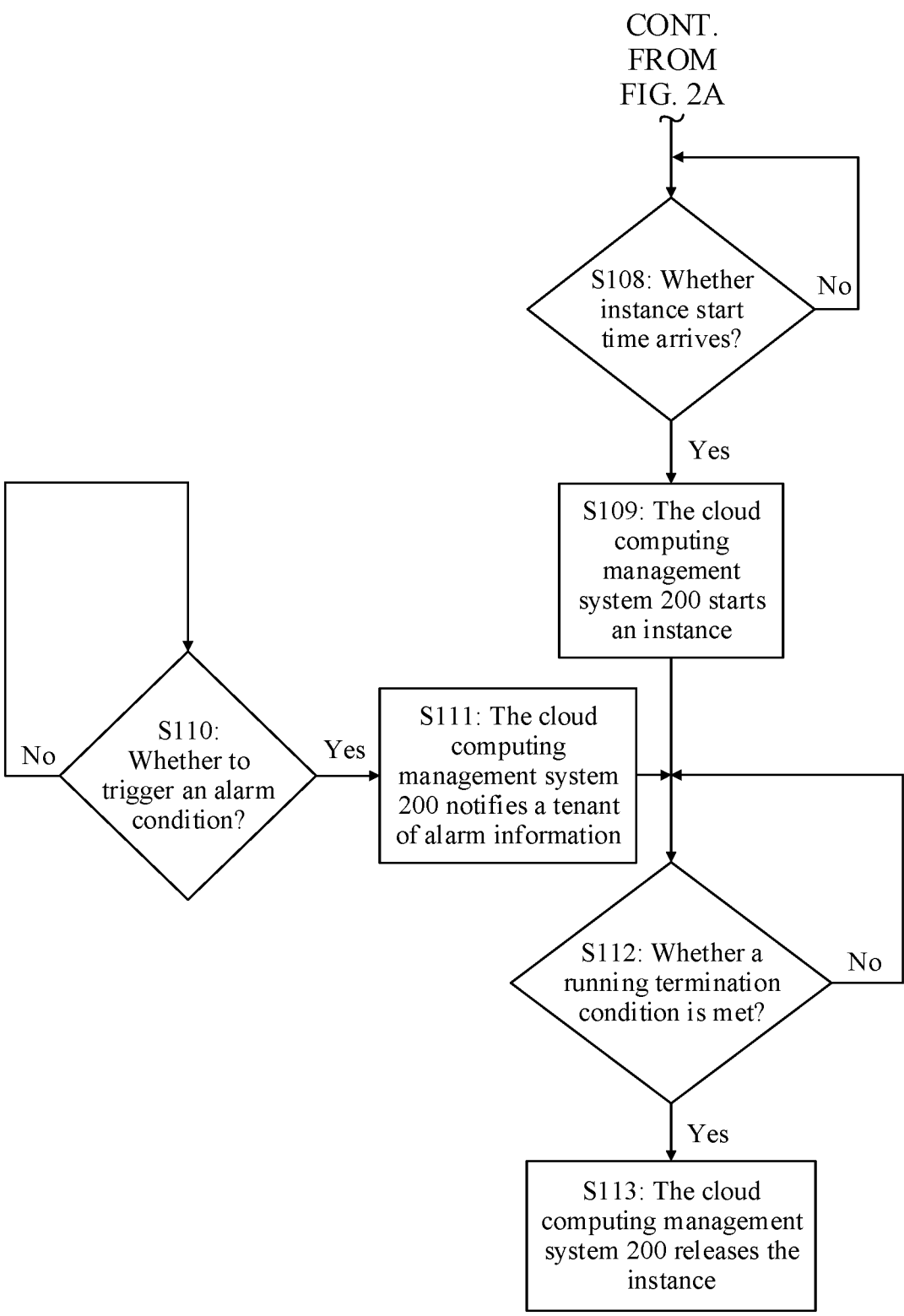

The following describes the instance allocation method 100 with reference to FIG. 2A and FIG. 2B.

S101: The cloud computing management system 200 receives the instance allocation request.

The tenant sends the instance allocation request to the cloud computing management system 200, where the instance allocation request includes a processor resource requirement.

Optionally, the instance allocation request further includes at least any one or more of the following parameters: an instance type, an available area, an instance specification, a minimum quantity of synchronous running instances, shortest valid running time, and a deadline.

Figure 3:
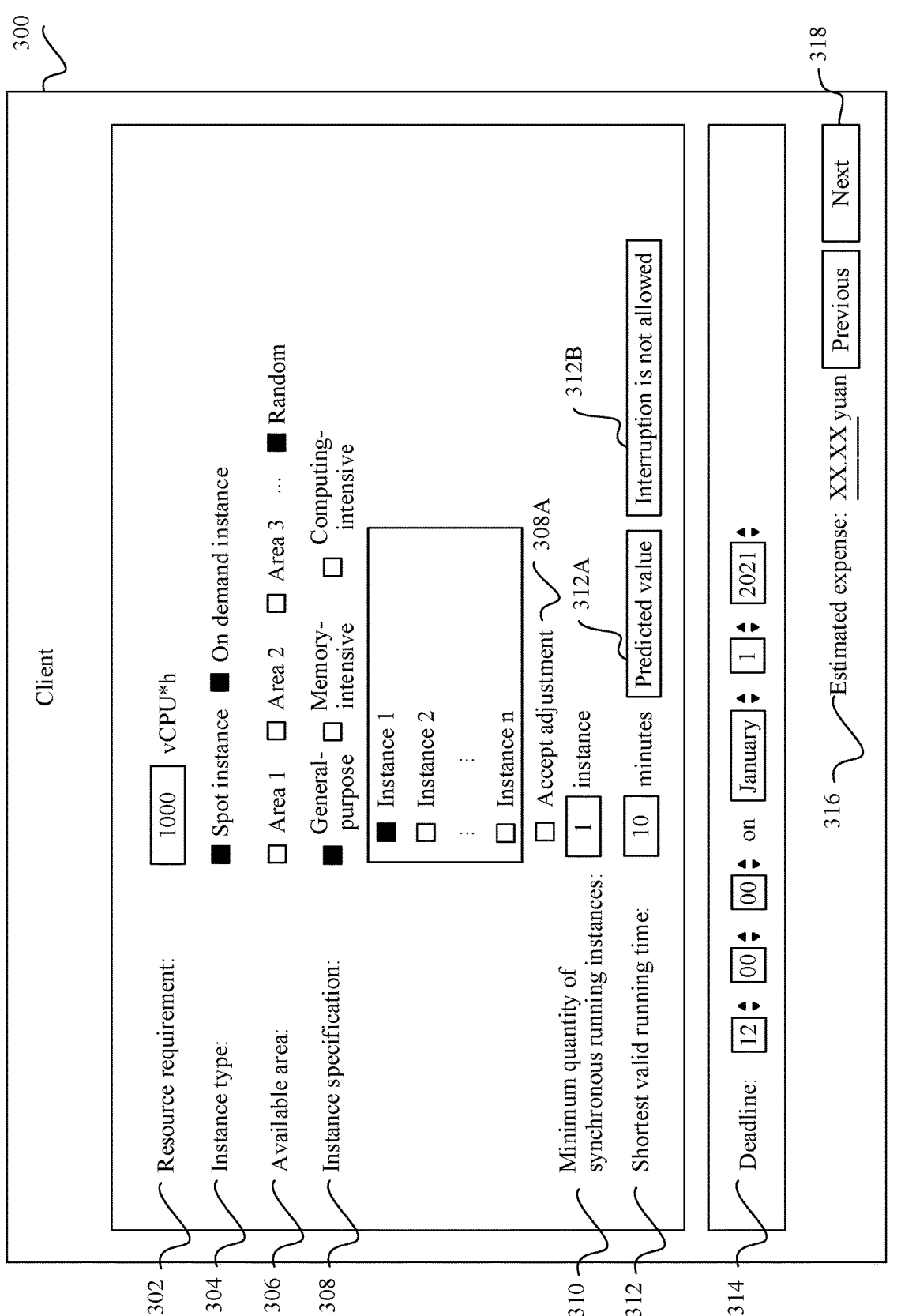
FIG. 3 is a schematic diagram of an interaction interface of a client according to an embodiment of this application.

For example, FIG. 3 provides a schematic diagram of an interaction interface 300 of the client displayed on the tenant side. The client may run on a tenant side device, for example, a terminal device such as a mobile phone or a PC. The client may be specifically implemented by using a browser or an independent application.

As shown in FIG. 3, the interaction interface 300 has controls for setting and uploading. The tenant may input or adjust a parameter in the control, to upload the instance allocation request.

Specifically, the interaction interface 300 includes any one or more of the following controls: a resource requirement input control 302, an instance type selection control 304, an available area selection control 306, an instance specification selection control 308, a minimum quantity of synchronous running instances setting control 310, a shortest valid running time setting control 312, a deadline setting control 314, an estimated expense control 316, and an OK control 318.

The tenant may input a resource requirement via the resource requirement input control 302. The resource requirement includes a computing resource required by the tenant, namely, the processor resource requirement, and is represented by a product of a quantity of processors and duration. Optionally, the resource requirement further includes any one or more (not shown in FIG. 3) of a network resource requirement and/or a storage resource requirement.

For example, if a tenant estimates that, to complete a task, 10 virtual central processing units (vCPUs) are required to work continuously for 100 hours, a resource requirement corresponding to the task includes a processor resource requirement of 1000 vCPU*h.

In some possible implementations, the resource requirement further includes the network resource requirement, for example, a bandwidth requirement and a public internet protocol (IP) address requirement.

In some possible implementations, the resource requirement further includes the storage resource requirement, for example, a memory space size.

In some possible implementations, the processor resource requirement may further include a product of duration and a heterogeneous processor resource such as a GPU.

The tenant may select an instance type via the instance type selection control 304. An available instance type includes at least one of a spot instance and an on demand instance. Specifically, the on demand instance indicates that charging is performed based on actual use time, which is flexible. For example, based on a price of each instance in the unit of hour, charging is performed based on actual usage time (seconds) of a user. The spot instance is an instance running on an idle computing resource sold at a lower price. A price of the spot instance varies according to the market supply and demand. The idle computing resource indicates an unoccupied part of a computing resource owned by a cloud service provider.

In some possible implementations, the tenant may select a combination of the two instance types. For example, to ensure running of some core tasks, the tenant can purchase a specific quantity of on demand instances. Further, the tenant may set 80% of instance types as the spot instance and 20% as the on demand instance. In this possible implementation, a proportion setting control (not shown in FIG. 3) may be provided for the tenant. In this possible implementation, when the instance type selected by the tenant includes the on demand instances, the tenant needs to set a quantity of purchased on demand instances.

As described above, the cloud computing management system 200 may formulate the instance allocation solution for the tenant. It should be noted that, when the instance allocation solution is formulated, the instance type selected by the tenant in the instance type selection control 304 is preferably considered. Optionally, when the instance allocation solution is formulated, when the cloud computing management system 200 considers that the instance type selected by the tenant cannot meet the resource requirement of the tenant, but another instance type not selected by the tenant can meet the resource requirement, the cloud computing management system 200 may recommend that the tenant allows adding an instance of the another instance type to meet the resource requirement.

Optionally, the tenant may also be recommended to adjust proportions of instances of different instance types set by the tenant, to meet the resource requirement of the tenant.

The tenant may select an available area via the available area selection control 306. The available area indicates a deployment location of the instance purchased by the tenant. An instance close to a task location is selected, to reduce a network latency and improve an access speed. Alternatively, the tenant may not select the available area, but select an available area selected by the cloud computing management system 200.

The tenant may specify an instance specification via the instance specification selection module 308. Generally, different instances include different quantities of vCPUs, computing capabilities of vCPUs, and memory space sizes. Some instances may further include other types of processor resources, for example, a GPU and a field programmable gate array (FPGA). The instance specifications may be classified into general-purpose, memory-intensive, and computing-intensive types. The tenant can select the instance specification based on a task characteristic, to better meet the task of the tenant.

It should be noted that each type may include instances of a plurality of specifications. For example, general-purpose instances include instances 1 to n, where n is greater than and equal to 2. The tenant can purchase the instance of an appropriate specification as required. For example, the general-purpose instances include two types of instances: 16 vCPUs and 24 vCPUs. As shown in the general-purpose instances in FIG. 3, an instance 1 includes 16 vCPUs, and an instance 2 includes 24 vCPUs.

In some possible implementations, the tenant may choose, by tapping an accept adjustment control 308A, to accept adjustment performed by the cloud computing management system 200 on the instance specification provided for the tenant. In other words, even if the tenant selects the instance of the specific specification in the instance specification selection module 310, after the tenant chooses to accept the adjustment by the cloud computing management system 200, when the cloud computing management system 200 cannot formulate the instance allocation solution that can meet the resource requirement, the cloud computing management system 200 may adjust the instance specification to make response to the instance allocation request of the tenant. A specific response method is described below.

In some possible implementations, the tenant may select instances of different specifications at the same time, and set a proportion for a quantity of instances. For example, an instance specification proportion setting control (not shown in FIG. 3) may be added to the instance specification selection module 308. The tenant may set an instance specification that is expected to be allocated to the tenant to 50% as the general-purpose instances and 50% as the memory-intensive instances. Further, the tenant may select a specific instance specification under each type of instance specification and set a proportion.

The tenant may set a minimum quantity of synchronous running instances via the minimum quantity of synchronous running instances setting control 310. For some tasks for which at least two instances need to be started to run at the same time, if the cloud computing management system 200 determines that a quantity of instances that can be currently allocated is less than the minimum quantity of synchronous running instances, it is considered that the tasks cannot run, and therefore no instance is allocated to the tenant.

The tenant may set shortest valid running time of the instance via the shortest valid running time setting control 312. Specifically, any continuous running time (from start of the instance to suspension or termination) of the instance allocated by the cloud computing management system 200 to the tenant should be greater than the shortest valid running time. Generally, the cloud service provider may set different priorities for instances of different instance types. For example, a priority of a spot instance is lower than that of an on demand instance. If instance resources are limited, running of the spot instance can be stopped in advance and a computing resource originally supporting running of the spot instance is used to run the on demand instance, to make response to the corresponding instance allocation request.

As mentioned above, when the spot instance is stopped in advance, the task is terminated in advance. For some tasks, if a task is stopped halfway, the entire task fails, for example, training of a neural network model. For some tasks that can be performed segment by segment, if a task is stopped halfway, the task may fail partially. For example, for a rendering task, a minimum unit of rendering is a pixel, and rendering results of pixels do not affect each other. Therefore, when the rendering task is stopped halfway, a rendering result obtained by a pixel that has been rendered can be stored and available.

Therefore, the tenant can set the shortest valid running time to ensure normal running of the task and prevent a failure of the entire task caused by task interruption or early termination. In addition, this avoids a waste of the computing resources.

For example, when the shortest valid running time set by the tenant is 10 minutes, any continuous running duration of a computing instance allocated to the tenant cannot be less than 10 minutes.

In some possible implementations, the cloud computing management system 200 may predict the shortest valid time by using a prediction model based on historical purchase information of the tenant. Specifically, the tenant may use, by tapping a control 312A, a predicted value provided by the system 200.

In some possible implementations, the tenant may set, by tapping a control 312B, whether to allow instance running interruption.

Specifically, when the tenant taps the control 312B, it indicates that the tenant does not allow interruption of the instance allocated to the tenant in a running process. In this case, the instance is more appropriate for running a task that has a high requirement on continuity, such as an online task.

When the tenant does not tap the control 312B, it indicates that the tenant allows interruption of the instance allocated to the tenant in a running process. In this case, the instance is more appropriate for running a task that has a low requirement on continuity, such as an offline task.

The tenant may set, via the deadline setting control 314, a deadline corresponding to the instance allocation request. The deadline indicates latest time at which the cloud computing management system 200 meets the resource requirement uploaded by the tenant. In other words, the resource requirement that is set by the tenant in the control 302 needs to be met and provided for the tenant before the deadline. In addition, the instance allocated to the tenant to meet the resource requirement further needs to meet various parameters set by the tenant in the controls 304 to 312.

The tenant may obtain an estimated expense of this purchase via the estimated expense control 316. The estimated expense is determined by parameters set by the tenant in the controls 302 to 314.

The tenant may complete, by tapping the OK control 318, uploading of the instance allocation request and confirmation of the estimated expense.

The tenant may further configure, on the client, one or more of the following parameters as required: an image used by the instance, a snapshot policy, a security group used by the instance, and the like (not shown in FIG. 3).

It should be noted that, the controls 304 to 314 on the client shown in FIG. 3 are all optional.

After receiving the instance allocation request of the tenant, the cloud computing management system 200 may formulate the instance allocation solution based on a prediction result of an idle state of a computing resource in a future period of time. A predicted value of an idle state of a computing resource indicates idle time and an idle quantity of various types of resources (for example, the processor resource, the network resource, and/or the storage resource) in a future time unit. Specifically, a computing resource allocation part includes S102 to S108.

It should be noted that, in some possible implementations, the cloud computing management system 200 may further receive, through an application programming interface (API), the instance allocation request uploaded by the tenant.

S102: The cloud computing management system 200 predicts an idle state of a computing resource.

After the tenant uploads the instance allocation request in S101, the cloud computing management system 200 may be triggered to predict the idle state of the computing resource in a future period of time. The prediction may be triggered when the tenant taps the OK control 318 or when the tenant completes filling the parameters in the controls 302 to 314.

Optionally, the prediction of the idle state of the computing resource may not be directly triggered by the tenant, but may be performed at a specific period. For example, the prediction is performed every 10 seconds.

Descriptions are provided below by using an example in which a tenant triggers prediction of an idle state of a computing resource.

A predicted idle state of the computing resource may be obtained by using a computing resource prediction model. The computing resource prediction model may be established based on a neural network model. For example, the computing resource prediction model is established based on a back propagation (BP) algorithm or a long short-term memory (LSTM) algorithm. It should be noted that a method for establishing the computing resource prediction model is not limited in this embodiment of this application.

Specifically, an input of the prediction model may be one or more of the following parameters: a computing resource that can be provided by a cloud service provider, an idle computing resource at a current moment, a quantity of idle computing devices at the current moment, a communication speed of an idle computing device, a communication distance of an idle computing device, a quantity of tenants who submit an instance allocation request, a request response rate of each tenant, and the like. Specifically, the parameters used as the input may be selected from parameters related to an output by using a correlation analysis method.

It should be noted that the parameters may be collected and obtained by the cloud computing management system 200.

Before performing the prediction, the computing resource prediction model further needs to be trained. Likewise, an input of model training may be one or more of the following parameters: a computing resource that can be provided by a cloud service provider at a historical moment, an idle computing resource at a historical moment, a quantity of idle computing devices at a historical moment, a communication speed of an idle computing device at a historical moment, a communication distance of an idle computing device at a historical moment, a quantity of tenants who submit an instance allocation request at a historical moment, a request response rate of each tenant at a historical moment, and the like. An output of model training is a computing resource actually used by the tenant that sends the instance allocation request at the historical moment. The computing resource actually used by the tenant may be obtained by the cloud computing management system 200 by collecting historical data.

For example, a tenant once requested to use an on demand instance at 13:00. At least one of a computing resource that can be provided by a server provider, an idle computing resource at 13:00, a quantity of idle computing devices at 13:00, a communication speed of an idle computing device at 13:00, a communication distance of an idle computing device at 13:00, a quantity of tenants who submit an instance allocation request at 13:00, and a request response rate of each tenant at 13:00 may be used as an input of training of the computing resource prediction model. In addition, it is assumed that the tenant terminates running of the on demand instance at 14:00, a computing resource used by the tenant between 13:00 and 14:00 may be used as an output of training of the computing resource prediction model.

FIG. 4A shows a prediction result of an idle state of a computing resource. As shown in FIG. 4A, an idle status of computing resources in a future period of time may be represented by using a matrix. A server is used as an example below.

Specifically, each column of the matrix represents a moment, and each row represents a specification of a server. n indicates n moments included in the future period of time, and m indicates a quantity of server types in prediction. An interval between prediction points and a quantity n of prediction points may be set as required, and the time interval multiplied by n is equal to total prediction duration.

A server has two states: running and not running. Correspondingly, when the server is idle, that is, can be used, a running status of the server is set to 1; otherwise, a running status of the server is set to 0. Considering that there is at least one server of a same specification, each element in the matrix obtained through the prediction represents a quantity of servers of the specification that exist at a moment and that can be used. For example, as shown in FIG. 4B, Sin being equal to 7 indicates that at a moment n, it is predicted that there are seven available servers 1. Likewise, $S_{mn}$ being equal to 4 indicates that at a moment n, it is predicted that there are four available servers m.

It should be noted that the total quantity m of the servers in the prediction may be a quantity of all server specifications that can be provided by the cloud service provider, or may be a quantity of servers of this type determined based on the instance specifications selected by the tenant in S101.

In some possible implementations, a floating price of the spot instance may be predicted. For a specific prediction method, refer to the foregoing prediction method. A difference lies in that one or more of the following parameters are used as an input: a spot instance price at the current moment, a spot instance price at a previous moment, a quantity of tenants who submit an instance allocation request, a request response rate of each tenant, and the like. A type of the input of the prediction model is not limited in this application. Likewise, the parameters used as the input may be selected from parameters related to an output by using a correlation analysis method. The output is a matrix formed by prices of spot instances at moments within a period of time.

Training data of a spot instance price prediction model may also be obtained by the cloud computing management system 200 through collecting historical data.

S103: The cloud computing management system 200 formulates the instance allocation solution based on the instance allocation request and the predicted idle state of the computing resource.

As described above, after triggering the prediction of the idle state of the computing resource, the tenant may obtain the predicted idle state of the computing resource by using the computing resource prediction model. The instance allocation solution may be formulated based on the instance allocation request uploaded by the tenant in S101 and the predicted idle state.

In some possible implementations, the instance allocation solution may be obtained by using a single-objective or multi-objective optimization method based on the instance allocation request uploaded by the tenant in S101 and the prediction result. An optimization objective may be set as required.

For example, the optimization objective may be one or more of the following indicators: a high instance allocation request response rate, low computing resource purchase costs, short average time consumption, and the like. The instance allocation request response rate indicates a probability of a response after the tenant uploads the instance allocation request; the computing resource rental costs indicate costs of purchasing a corresponding computing resource; and the average time consumption indicates average of time spent in completing instance allocation requests of one or more tenants. It should be noted that a type of the optimization objective is not limited in this embodiment of this application.

Optimization methods specifically used in single-objective/multi-objective optimization include optimization methods such as linear programming, a genetic algorithm, and a particle swarm algorithm.

After the optimization objective is determined, an objective function may also be obtained. Further, a constraint condition further needs to be determined. The constraint condition may be a type of condition that ensures normal running of the cloud computing management system. For example, at a moment, the computing resources provided for the tenant should not exceed available computing resources at that moment. In addition, the constraint condition may further include the parameter set by the tenant. For example, running of the instance should meet the uploaded instance allocation request in FIG. 3.

After the objective function and the constraint condition are determined, a single-objective/multi-objective optimization problem can be solved by using an optimization algorithm, so as to obtain the instance allocation solution. Specifically, after the optimization problem is solved, at least the following three cases may occur: no solution, a unique solution, and a non-unique solution. The three solutions respectively correspond to an allocation failure, an instance allocation solution, and a plurality of instance allocation solutions.

S104: The cloud computing management system 200 determines whether there is the instance allocation solution that meets the instance allocation request.

Whether there is the instance allocation solution that meets the instance allocation request of the tenant may be determined based on the solution of the optimization problem obtained in S103. When the solution corresponds to the allocation failure, go to S105. When the instance allocation solution is one or more instance allocation resources, go to S107.

S105: The cloud computing management system 200 generates an adjustment solution.

Specifically, if determining that response fails to be made to the instance allocation request of the tenant, the cloud computing management system 200 provides one or more adjustment solutions for the tenant.

In some possible implementations, the cloud computing management system 200 may notify, on the client, the tenant that the instance allocation request cannot be met. In addition, the tenant may be requested to modify the parameters in the instance allocation request and upload the instance allocation request obtained after modification. That is, S101 is performed again.

In some possible implementations, the cloud computing management system 200 adjusts the solution and may provide one or more adjustment solutions for the tenant, and each adjustment solution includes an adjustment solution for at least one parameter in the instance allocation request. For example, it can be recommendations such as reducing the resource requirement, changing or expanding the instance type, changing or expanding the available area, changing or expanding the instance specification, and postponing the deadline.

In some possible implementations, the parameters in the instance allocation request have a priority sequence. That is, when an adjustment solution is generated, some parameters that are easy to accept adjustment by the tenant, for example, the deadline, are preferably adjusted. After the foregoing type of parameters is adjusted and the adjustment solution is formed, some parameters that are difficult to accept adjustment by the tenant, for example, the available area and the instance specification, may be adjusted, to form another adjustment solution. The priority sequence between the parameters may be set as required.

In some possible implementations, there is also a priority sequence between the one or more adjustment solutions provided by the cloud computing management system 200 for the tenant. As described above, there is the priority sequence between the parameters in the instance allocation request. Therefore, there is also the priority sequence between adjustment solutions formed based on parameter adjustment. Further, a present sequence of the adjustment solutions provided for the tenant to select may be performed according to the priority sequence. For example, an adjustment solution with a higher priority is preferably provided for the tenant. If the tenant is not satisfied with the current adjustment solution, the tenant can be provided with a solution whose priority is lower than the current priority.

Optionally, the adjustment solutions provided for the tenant to select may also be presented in the interaction interface. A quantity of adjustment solutions may be set as required. In other words, a quantity of adjustment solutions presented in the interaction interface may be less than a quantity of adjustment solutions that actually meet the resource requirement of the tenant. The presented adjustment solutions may be selected randomly, or may be selected according to the priority sequence. For example, a priority of a solution obtained based on postponing the deadline may be higher than a priority of an adjustment solution formed based on instance specification adjustment, and the solution obtained based on postponing the deadline is displayed above the interaction interface. A specific priority sequence may be set as required.

Figure 5:
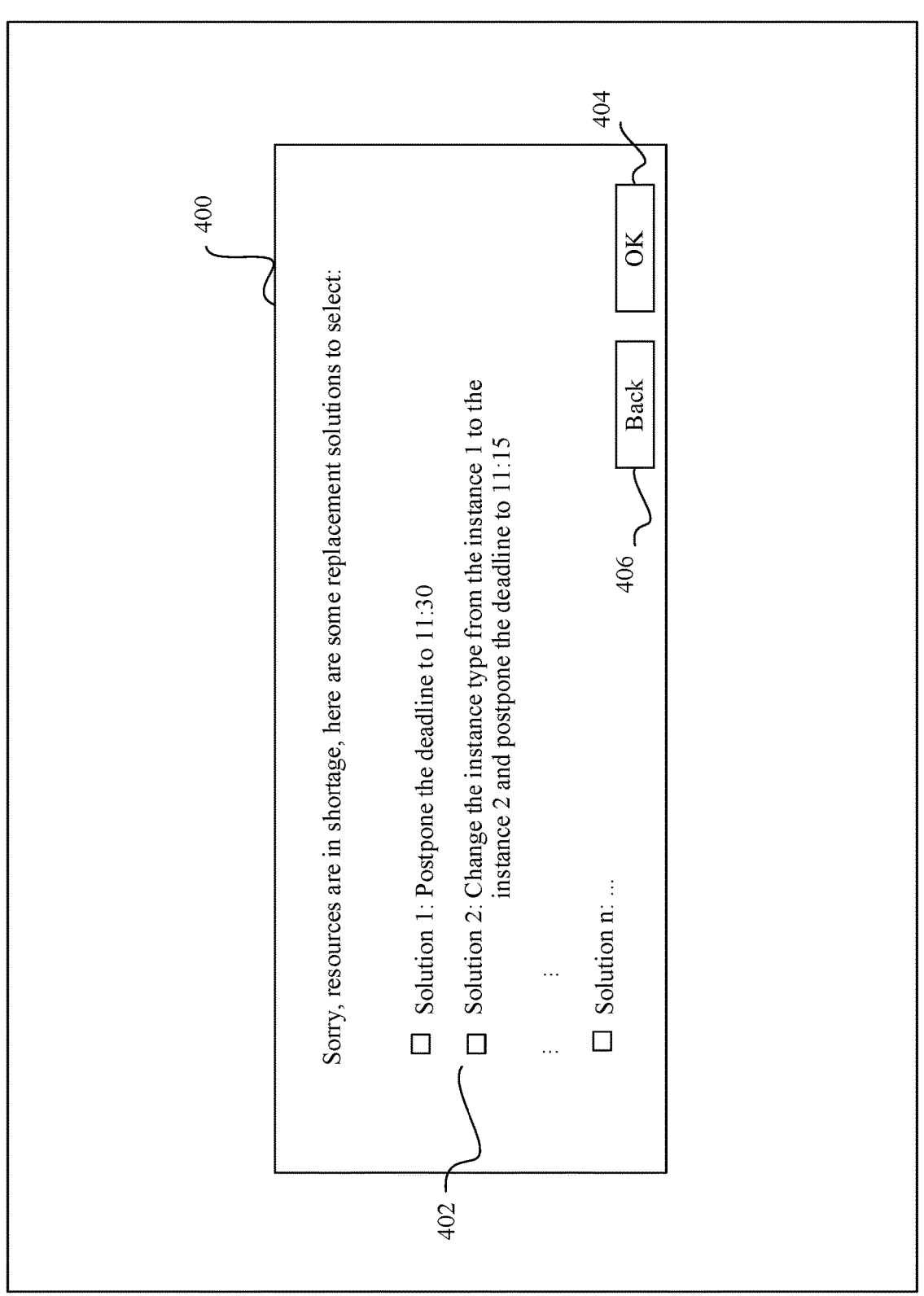
FIG. 5 is a schematic diagram of an interaction interface of another client according to an embodiment of this application.

The tenant can be notified of the adjustment solution in a pop-up window or a link. FIG. 5 shows a manner of presenting an adjustment solution. As shown in FIG. 5, an adjustment solution interface 400 is displayed on a client page in a pop-up window. The adjustment solution interface 400 includes at least one adjustment solution, an OK control 404, and a Back control 406.

It is assumed that a deadline in an initial instance allocation request of a tenant is set to 11:00. An adjustment solution 1 shown in FIG. 5 is "Postpone the deadline to 11:30". Further, the adjustment solution may be recommending adjusting two or more parameters at the same time. For example, a solution is "Change the instance specification (from the instance 1 to the instance 2) and postpone the deadline to 11:15". In addition, the tenant may tap an adjustment solution selection control 402 according to an actual situation to select a feasible adjustment solution, and complete determining of the adjustment solution by tapping the OK control 404. If the tenant cannot accept the adjustment solution provided in the adjustment solution, the tenant may close the adjustment solution interface 400 by tapping the Back control 406.

S106: Whether the cloud computing management system 200 receives acknowledgment information of the adjustment solution is determined.

The tenant may determine whether the adjustment solution provided in S105 can meet the task of the tenant. If the tenant determines that there is at least one adjustment solution that can meet the task of the tenant in the adjustment solution, the tenant may select the feasible adjustment solution by tapping the adjustment selection control 402. In addition, the adjustment solution is determined by tapping the OK control 404, so as to upload the adjustment solution. Correspondingly, the cloud computing management system 200 receives the instance allocation solution acknowledged by the tenant.

Alternatively, the tenant may choose not to accept the adjustment solution, to give up initiating the instance allocation request. Specifically, if the tenant determines that the adjustment solution provided by the cloud computing management system 200 cannot meet the task of the tenant, the tenant may choose not to accept the adjustment solution. For example, the tenant may choose not to accept the adjustment solution by tapping the Back control 406 in FIG. 5.

In some possible implementations, the tenant may complete selection and acknowledgment of the adjustment solution through an API. Correspondingly, the cloud computing management system 200 may receive the acknowledgment information of the tenant for the adjustment solution in an API response manner.

S107: The offline cloud computing management system 200 sends acknowledgment information of the instance allocation solution.

The cloud computing management system 200 may determine the final instance allocation solution based on the instance allocation solution that meets the instance allocation request in S104 or the instance allocation solution that the tenant acknowledges to accept in S106.

Specifically, information about the instance allocation solution that needs to be acknowledged by the tenant may be displayed in the interaction interface 300, or may be displayed on another interaction interface or client. Descriptions are provided below by using another interaction interface 500 as an example.

Figure 6:
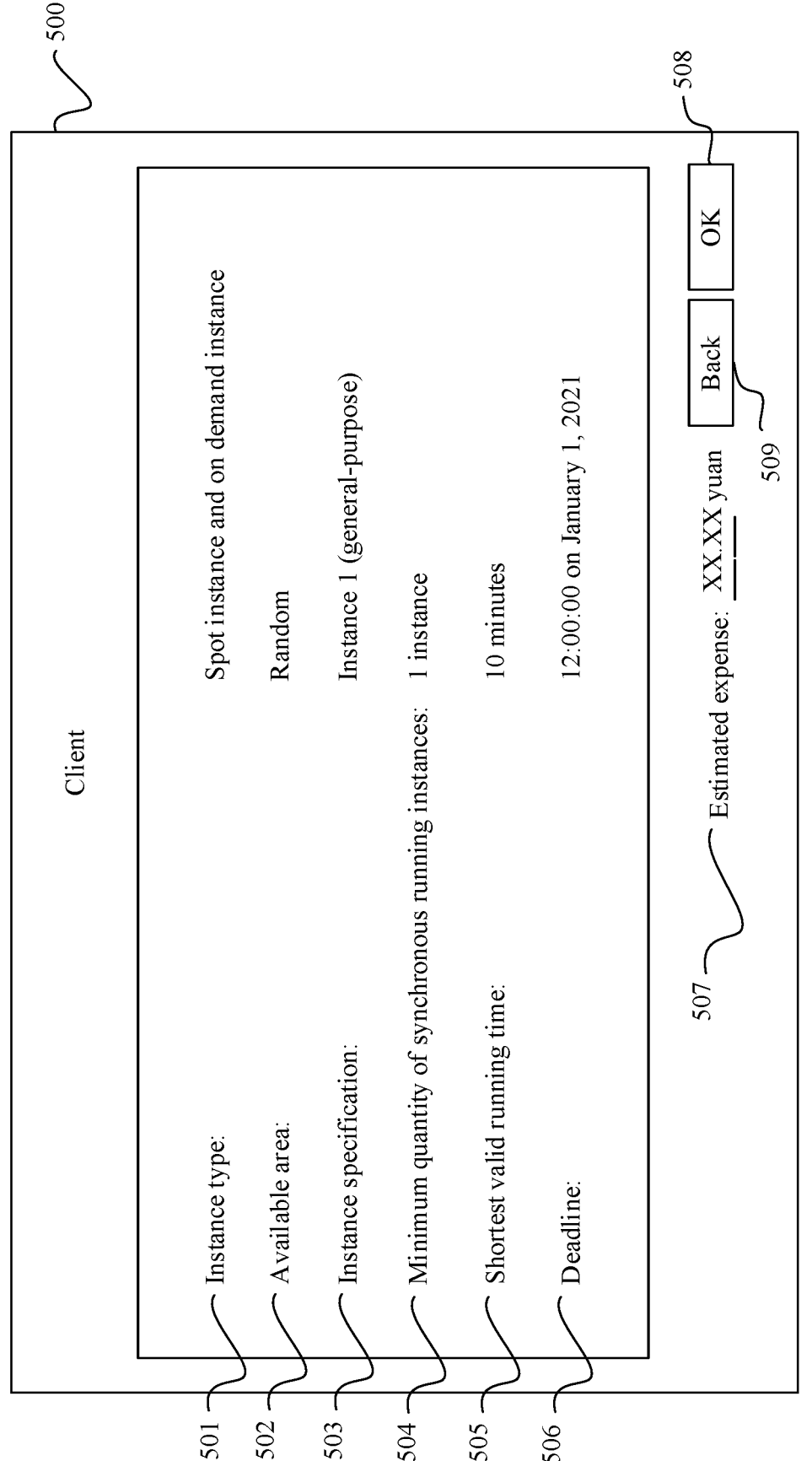
FIG. 6 is a schematic diagram of an interaction interface of still another client according to an embodiment of this application.

As shown in FIG. 6, the interaction interface 500 includes at least one or more of the following parameters: an instance type 501, an available area 502, an instance specification 503, a minimum quantity of synchronous running instances 504, shortest valid running time 505, a deadline 506, an estimated expense 507, an OK control 508, and a Back control 509.

The foregoing parameter information presents information included in the instance allocation request uploaded by the tenant in S101, or parameter information obtained through adjustment based on the adjustment solution in S105. For example, when the tenant selects the spot instance and the on demand instance as the instance types in S101, and the instance allocation solution generated in S103 can meet the instance allocation request, or the instance types are not adjusted based on the adjustment solution in S105, the parameter 501 presents the instance types that can be purchased by the tenant: the spot instance and the on demand instance.

In some possible implementations, the instance types may be configured to be in a specific proportional relationship. For example, in the instance allocation solution formulated for the tenant, there are 80% spot instances, and remaining 20% on demand instances. This part of information may also be presented at the parameter 501 (not shown in FIG. 6).

In some possible implementations, the instance specification 503 also includes a plurality of instance specifications. For example, the instance allocation solution formulated for the tenant includes a specific proportion of general-purpose instances 1 and a specific proportion of memory-intensive instances 5. This part of information may also be presented at the instance specification 503 (not shown in FIG. 6).

In addition, the estimated expense of the current instance allocation solution is also presented at the parameter 507. The estimated expense is determined based on one or more of the parameter 501 to the parameter 506.

It should be noted that, as described above, the tenant may configure, on the client based on an actual requirement, one or more of the following parameters in the interaction interface 300 in FIG. 3: the image used by the instance, the snapshot policy, the security group used by the instance, and the like (not shown in FIG. 3). Therefore, the foregoing parameters (not shown in FIG. 6) set by the tenant in FIG. 3 should also be included in FIG. 6.

After acknowledging the current instance allocation solution, the tenant may complete acknowledgment of the instance allocation solution by tapping the control 508. Optionally, the control 509 may also be tapped to return to a previous interface, so as to adjust each parameter again, or give up uploading the instance allocation request.

After the tenant acknowledges the instance allocation solution, the cloud computing management system 200 may allocate the instance based on the solution, so that the tenant can run the task of the tenant on the instance obtained through allocation.

In some possible implementations, the acknowledgment information of the instance allocation solution may also be sent to the tenant through an API, so that the tenant acknowledges the instance allocation solution.

S108: The cloud computing management system 200 determines whether instance start time arrives.

In some possible implementations, after the tenant acknowledges the instance allocation solution, the cloud computing management system 200 may control running of each instance based on start time and stop time of the instance in the instance allocation solution in S107.

Based on the instance allocation solution acknowledged by the tenant in S107, when determining that the instance start time does not arrive, the cloud computing management system 200 does not start the instance. When determining that the instance start time arrives, the cloud computing management system 200 starts the corresponding instance based on the instance allocation solution.

It should be noted that the instance allocation solution provided in this application indicates when an instance of a specific specification is allocated to each tenant and a quantity of instances of each specification. Therefore, the instance is not necessarily started when the tenant acknowledges the instance allocation solution in S107. In addition, the instance allocation solution includes when to start the instance, and also includes when to interrupt or stop the instance.

In some possible implementations, the tenant may monitor when the cloud computing management system allocates the instance to the tenant. For example, the tenant may listen to an instance allocation status via a listening device, an API interface, or the like.

In some possible implementations, the tenant may upload the task of the tenant to the cloud computing management system 200.

The operation of uploading the task of the tenant by the tenant may be performed after the instance allocation request is uploaded (S101), or may be performed before the instance allocation request is uploaded (S101). Optionally, the instance allocation request may further include the task.

S109: The cloud computing management system 200 starts the instance.

In some possible implementations, after detecting, through the API, that the allocated instance has been obtained, the tenant may deploy and run the task of the tenant on the instance.

Optionally, when the tenant has uploaded the task to the cloud computing management system 200, the cloud computing management system 200 deploys and runs the task on the instance allocated to the tenant.

In some possible implementations, after the instance runs, as other tenants continuously upload instance allocation requests to the cloud computing management system 200, a quantity of available instances dynamically changes.

In some possible implementations, the instance may be allocated to and run for the tenant based on the instance allocation solution in S107 and a real-time idle state of the computing resource. The real-time idle state of the computing resource indicates a quantity of idle resources of each type at a current moment. Specifically, in a running process of the instance, an instance resource allocated to the tenant may be temporarily in shortage. As a result, time for completing the task of the tenant may be later than the deadline.

Optionally, when the instance resource allocated to the tenant is temporarily in shortage, the cloud computing management system 200 may allocate an available instance of a higher specification to the tenant without additional charging. This can ensure running of the task of the tenant.

In some possible implementations, the instance allocation solution may be adjusted according to a specific rule. After a new instance allocation request is received, the instance allocation solution of the tenant connected before this time may be modified, to implement optimal instance allocation. The prerequisite may be that a task completion status of the previously connected tenant is not affected.

For example, for a tenant 1, a deadline set in an instance allocation request is 22:00, and the cloud computing management system 200 allocates, to the tenant 1, one instance that can run between 11:00 and 12:00. If the system 200 receives a large quantity of instance allocation requests with an earlier deadline at 22:00, the system 200 may allocate the instance allocated to the tenant 1 to another user between 11:00 and 12:00, and allocate one instance between 14:00 and 15:00 to the tenant, to ensure that a task of the tenant 1 can be completed before the deadline.

In this possible implementation, the system 200 may determine, by calculating a violation probability of the tenant, whether the instance allocation solution of the tenant needs to be updated. The violation probability indicates a probability that the instance provided for the tenant in an updated instance allocation solution cannot meet a computing resource that is still required by the tenant before the deadline. Optionally, the probability may be obtained through prediction by using a violation probability prediction model. The violation probability model may be obtained through training based on historical data.

It should be noted that, for a method for updating the instance allocation solution, refer to the method for obtaining the instance allocation solution in S103.

S110: The cloud computing management system 200 determines whether to trigger an alarm condition.

After starting the instance, the cloud computing management system 200 may generate an alarm for the tenant based on the provided computing resource. Specifically, a remaining resource requirement may be obtained based on the resource requirement set by the tenant in S101 and a used computing resource. When the used computing resource or the remaining resource requirement reaches a threshold, the cloud computing management system 200 may send alarm information to the tenant. The threshold may be set as required.

For example, when the computing resources used by the tenant have reached 80%, that is, when the remaining resource requirement of the tenant is reduced to 20%, the cloud computing management system 200 may send the alarm information to the tenant, to notify the tenant of a service process. Further, the tenant can determine, based on the alarm information, whether to purchase more resources or stop running of the instance in advance.

It should be noted that one or more thresholds may be set for triggering the alarm information. That is, during the running of the task, the alarm information may be triggered once or more times.

When it is detected that the alarm condition is met, go to S112.

S111: The cloud computing management system 200 notifies the tenant of alarm information.

The alarm information sent by the cloud computing management system 200 to the tenant includes at least one of the following parameters: the used computing resource and the remaining computing resource. Optionally, the alarm information may further include at least one of the following parameters: time spent, duration to the deadline, and the like.

Further, the tenant may determine, based on the alarm information, whether the remaining resource requirement can be met before the deadline.

In some possible implementations, when the tenant determines that the remaining resource requirement of the tenant may not be met before the deadline, the tenant may adjust the purchased computing resource. For example, more computing resources may be purchased.

In some possible implementations, on a premise that an agreement is signed with the tenant in advance, the instance allocation request may be actively adjusted for the tenant based on the alarm information. The active adjustment operation may be performed by the cloud computing management system 200.

Optionally, the operation may alternatively be performed by a task management system at a big data layer. The task management system at the big data layer is a system that manages and runs a computing resource.

S112: The cloud computing management system 200 determines whether a running termination condition is met.

During the running of the instance, the running status of the instance is monitored to determine whether the instance meets the running termination condition. The running termination condition may be that execution of the instance allocation solution is completed, the deadline arrives, or the like.

The cloud computing management system 200 determines whether the instance meets the running termination condition, and may monitor a running status of the computing resource at a specific period. Duration of the specific period may be set as required.

It should be noted that there is no specific sequence between S112 and alarm-related steps in S110 and S111. That is, the operation of determining whether the instance meets the running termination condition may occur before or after the alarm operation; or optionally, the operation may be performed synchronously with the alarm operation.

S113: The cloud computing management system releases the instance.

When determining that the running termination condition is met in S112, the cloud computing management system 200 releases the instance. For example, when it is determined in S112 that execution of an instance allocation solution of a tenant has been completed or a deadline has arrived, an instance allocated to the tenant is released.

Figure 7:
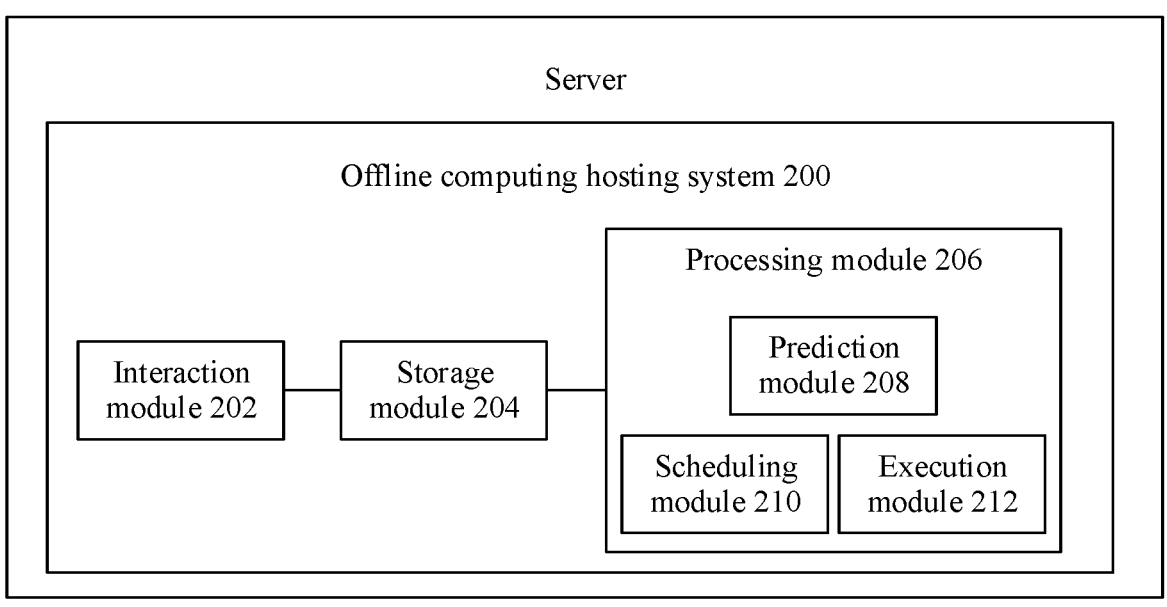
FIG. 7 is a schematic diagram of a structure of a cloud computing management system according to an embodiment of this application.

This application further provides a cloud computing management system 200. As shown in FIG. 7, the cloud computing management system 200 includes an interaction module 202, a storage module 204, and a processing module 206. In addition, the cloud computing management system 200 is deployed on a server. The server may be one or more local servers, or may be one or more cloud servers. Optionally, the server may alternatively be a combination of one or more local servers and one or more cloud servers.

Modules in the cloud computing management system 200 are described below.

The interaction module 202 is configured to receive, in S101, the instance allocation request uploaded by the tenant. The interaction module 202 is further configured to present the adjustment solution generated in S105 to the tenant. The interaction module 202 also receives an acknowledgment status of the tenant for the adjustment solution in S106. The interaction module 202 is further configured to present, in S107, the instance allocation solution in S104 or the instance allocation solution in S105 to the tenant. The interaction module 202 is further configured to receive the task uploaded by the tenant before S112.

The storage module 204 is configured to store the parameters of the instance allocation request received in S101. In the instance allocation method 100, the storage module 204 also stores the training input and the training output that are collected by the cloud computing management system and that are used to train the computing resource prediction model. The storage module 204 is further configured to store the instance allocation solution acknowledged by the tenant in S107. The storage module 204 also stores the alarm condition set by the tenant in S110. The storage module 204 is further configured to store the task uploaded by the tenant to the cloud computing management system before S112.

The processing module 206 is configured to: in the instance allocation method 100, train the computing resource prediction model in S102, and obtain the predicted idle state of the computing resource by using the computing resource prediction model. The processing module 206 is further configured to formulate the instance allocation solution in S103 based on the instance allocation request of the tenant and the predicted idle state of the computing resource. The processing module 206 also generates the adjustment solution in S105. The processing module 206 also determines the instance allocation solution based on a status that the tenant receives the adjustment solution in S106. The processing module 206 is further configured to generate, in S107, the information about the instance allocation solution to be acknowledged by the tenant. The processing module 206 determines, based on the instance allocation solution acknowledged in S107, whether the instance start time arrives in S108, and whether the alarm condition is met in S110. The processing module 206 is further configured to run the instance in S109 and notify the tenant of the alarm information in S111 based on the instance allocation solution. The processing module 206 is further configured to run, on the instance, the stored task uploaded by the user before S112. The processing module 206 determines whether the instance meets the running termination condition in S112. The processing module 206 is further configured to release the instance in S113.

Specifically, the processing module 206 may include a prediction module 208, a scheduling module 210, and an execution module 212.

The prediction module 208 is configured to: in the instance allocation method 100, train the computing resource prediction model in S102, and obtain the predicted idle state of the computing resource by using the computing resource prediction model.

The scheduling module 210 is configured to formulate the instance allocation solution in S103 based on the instance allocation request of the tenant and the predicted idle state of the computing resource. The scheduling module 210 also generates the adjustment solution in S105. The scheduling module 210 also determines, based on whether the tenant receives the adjustment solution in S106, whether to make response to the instance allocation request. The scheduling module 210 is further configured to generate, in S107, the instance allocation solution to be acknowledged by the tenant.

The execution module 212 is configured to: determine, in S107, whether the acknowledged instance allocation solution arrives at the computing resource start time in S108, and determine, in S110, whether the alarm condition is met. The execution module 212 is further configured to run the instance in S109 and notify the tenant of the alarm information in S111 based on the instance allocation solution. The execution module 212 is further configured to run, on the instance, the stored task uploaded by the user before S112. The execution module 212 determines whether the instance meets the running termination condition in S112. The execution module 212 is further configured to release the instance in S113.

Figure 8:
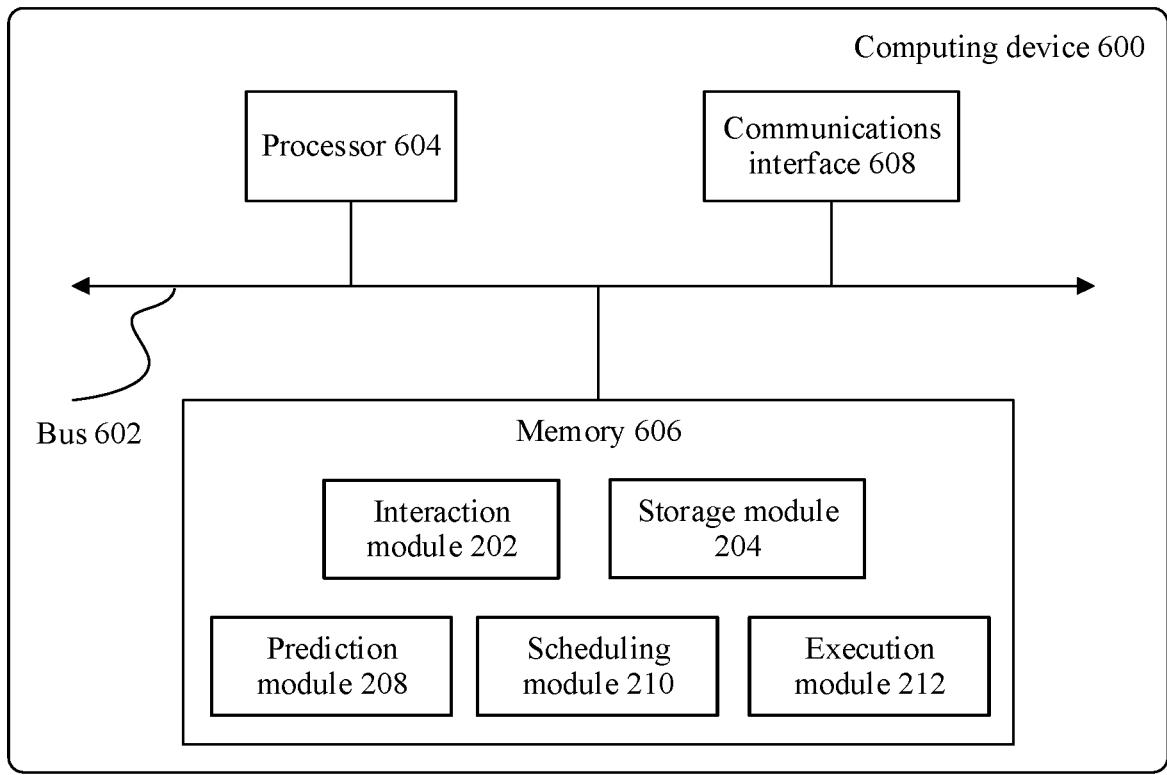
FIG. 8 is a schematic diagram of a structure of a computing device according to an embodiment of this application.

This application further provides a computing device 600. As shown in FIG. 8, the computing device includes a bus 602, a processor 604, a memory 606, and a communications interface 608. The processor 604, the memory 606, and the communications interface 608 communicate with each other through the bus 602. It should be understood that quantities of processors and memories in the computing device 600 are not limited in this application. The bus 602 may be a peripheral component interconnect (PCI) bus, an extended industry standard architecture (EISA) bus, or the like. Buses may be classified into an address bus, a data bus, a control bus, and the like. To facilitate representation, the bus is represented by using only one line in FIG. 8, but it does not indicate that there is only one bus or one type of buses. The bus 602 may include a path for transmitting information between components (for example, the memory 606, the processor 604, and the communications interface 608) of the computing device 600.

The processor 604 may be any one or more of processors such as a central processing unit (CPU), a graphics processing unit (GPU), a microprocessor (MP), or a digital signal processor (DSP).

The memory 606 may include a volatile memory, for example, a random access memory (RAM). The processor 604 may further include a non-volatile memory, for example, a read-only memory (ROM), a flash memory, a hard disk drive (HDD), or a solid state drive (SSD). The memory 606 stores executable program code, and the processor 604 executes the executable program code to implement the instance allocation method 100. Specifically, the memory 606 stores instructions used by the cloud computing management system 200 to execute the instance allocation method 100.

The communications interface 608 uses a transceiver module, for example, but not limited to a network interface card, a transceiver, to implement communication between the computing device 600 and another device or a communications network.

Figure 9:
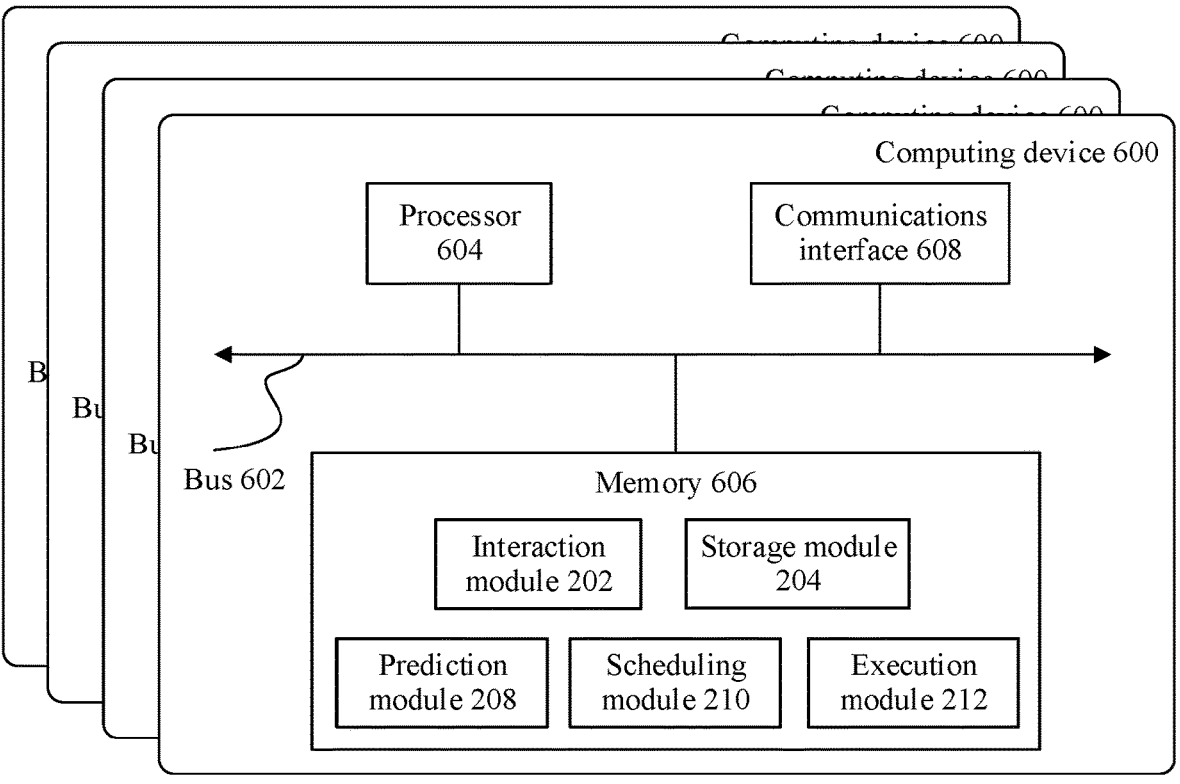
FIG. 9 is a schematic diagram of a structure of a computing device cluster according to an embodiment of this application.

An embodiment of this application further provides a computing device cluster. As shown in FIG. 9, the computing device cluster includes at least one computing device 600.

The memory 606 in one or more computing devices 600 in the computing device cluster may store same instructions used by the cloud computing management system 200 to execute the instance allocation method 100.

In some possible implementations, the one or more computing devices 600 in the computing device cluster may also be configured to execute some instructions used by the cloud computing management system 200 to execute the instance allocation method 100. In other words, a combination of the one or more computing devices 600 may jointly execute the instructions of the cloud computing management system 200 for performing the instance allocation method 100.

It should be noted that the memories 606 in different computing devices 600 in the computing device cluster may store different instructions for performing some functions of the instance allocation method 100.

Figure 10:
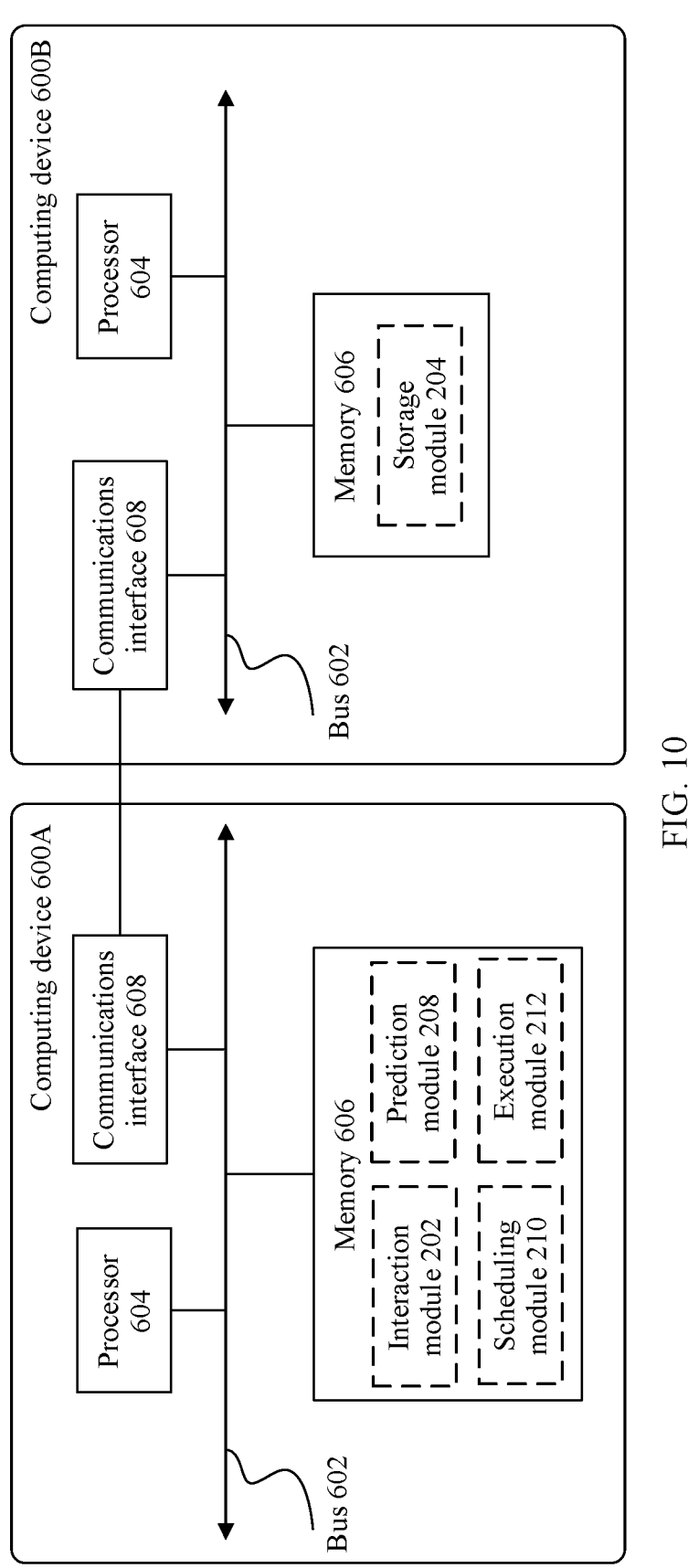
FIG. 10 is a schematic diagram of a structure of another computing device cluster according to an embodiment of this application.

FIG. 10 shows a possible implementation. As shown in FIG. 10, two computing devices 600A and 600B are connected through communications interfaces 608. The memory in the computing device 600A stores instructions used to perform functions of the interaction module 202, the prediction module 208, the scheduling module 210, and the execution module 212. The memory in the computing device 600B stores instructions used to perform a function of the storage module 204. In other words, the memories 606 of the computing devices 600A and 600B jointly store the instructions used by the cloud computing management system 200 to perform the instance allocation method 100.

A connection manner between computing device clusters shown in FIG. 10 may be considering that the instance allocation method 100 provided in this application needs to store a large quantity of parameters related to historical instance allocation requests of the tenant. Therefore, it is considered that the storage function is performed by the computing device 600B.

It should be understood that functions of the computing device 600A shown in FIG. 10 may also be completed by a plurality of computing devices 600. Likewise, functions of the computing device 600B may also be completed by a plurality of computing devices 600.

Figure 11:
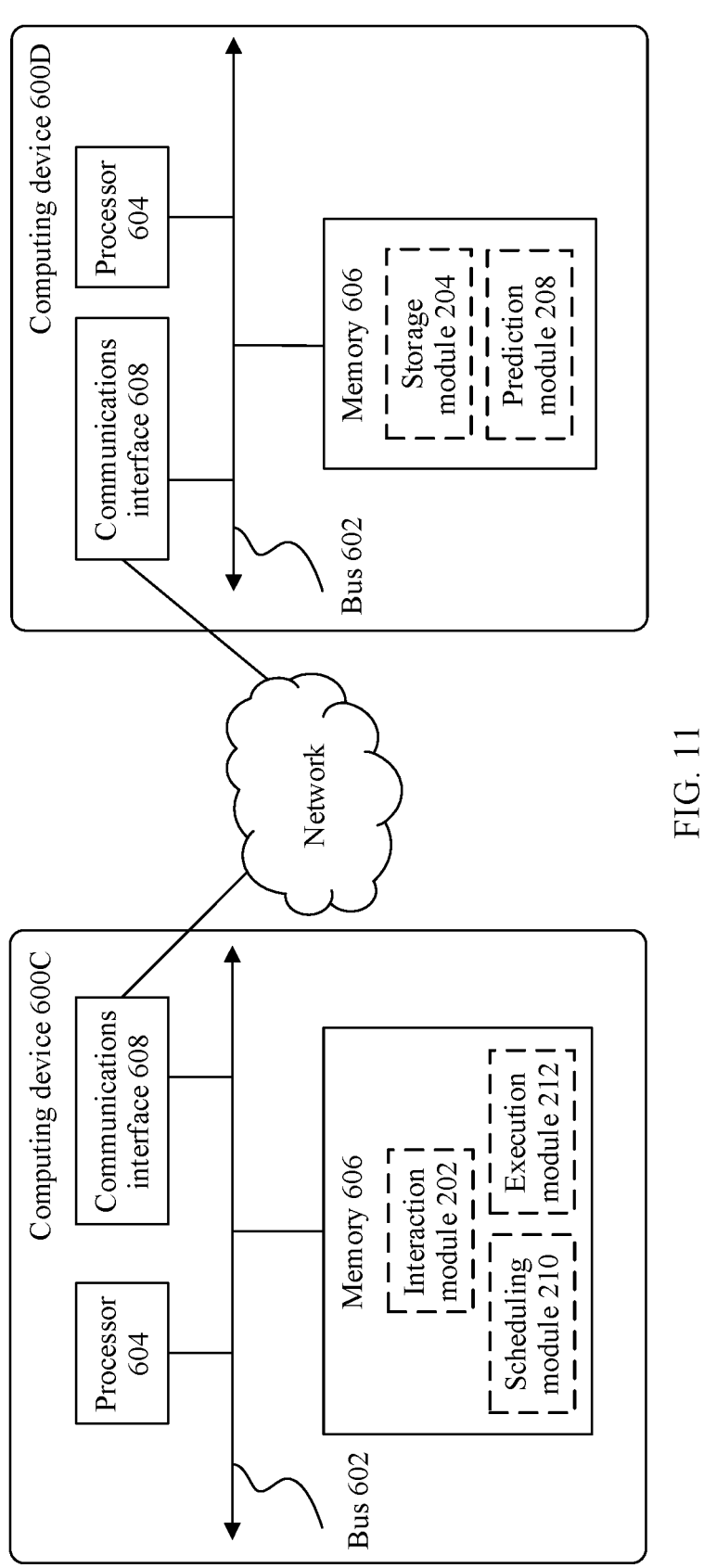
FIG. 11 is a schematic diagram of a structure of still another computing device cluster according to an embodiment of this application.

In some possible implementations, the one or more computing devices in the computing device cluster may be connected over a network. The network may be a wide area network, a local area network, or the like. FIG. 11 shows a possible implementation. As shown in FIG. 11, two computing devices 600C and 600D are connected over the network. Specifically, communications interfaces in the computing devices are connected to the network. In this possible implementation, the memory 606 in the computing device 600C stores instructions for executing the interaction module 202, the scheduling module 210, and the execution module 212. In addition, the memory 606 in the computing device 600D stores instructions for executing the storage module 204 and the prediction module 208.

A connection manner between computing device clusters shown in FIG. 11 may be considering that the instance allocation method 100 provided in this application needs to store a large quantity of parameters related to historical instance allocation requests of the tenant and perform a large quantity of trainings on the computing resource prediction model. Therefore, it is considered that the functions implemented by the storage module 204 and the prediction module 208 are performed by the computing device 600D.

It should be understood that functions of the computing device 600C shown in FIG. 11 may also be completed by a plurality of computing devices 600. Likewise, functions of the computing device 600D may also be completed by a plurality of computing devices 600.

An embodiment of this application further provides a computer-readable storage medium. The computer-readable storage medium may be any usable medium that can be stored by a computing device, or a data storage device, such as a data center, including one or more usable media. The usable medium may be a magnetic medium (for example, a floppy disk, a hard disk, or a magnetic tape), an optical medium (for example, a DVD), a semiconductor medium (for example, a solid-state drive), or the like. The computer-readable storage medium includes instructions, and the instructions instruct a computing device to perform the instance allocation method 100 applied to the cloud computing management system 200.

An embodiment of this application further provides a computer program product including instructions. The computer program product may be a software or program product that includes instructions and that can run on a computing device or be stored in any usable medium. When the computer program product runs on at least one computer device, the at least one computer device is enabled to perform the instance allocation method 100.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of the present invention.

What is claimed is:

1. An instance allocation method performed by a cloud computing management system, comprising:

receiving an instance allocation request uploaded by a tenant, wherein the instance allocation request comprises a processor resource requirement and a deadline, wherein the processor resource requirement needs to be met and provided for the tenant before the deadline;

generating an instance allocation solution based on the instance allocation request, wherein the instance allocation solution comprises a life cycle of an instance allocated to the tenant, wherein the life cycle indicates a start time and a stop time of the instance;

sending the instance allocation solution to the tenant;

receiving acknowledgment of the tenant for the instance allocation solution; and allocating, based on the instance allocation solution, the instance to the tenant from a cloud computing resource pool managed by the cloud computing management system.

2. The method according to claim 1, wherein the processor resource requirement comprises a product of a quantity of processors and duration.

3. The method according to claim 1, wherein the instance allocation request further comprises an available area, a minimum quantity of synchronous running instances, or shortest valid running time, the minimum quantity of synchronous running instances indicates a minimum quantity of instances that run simultaneously, the shortest valid running time indicates shortest running time of an instance each time.

4. The method according to claim 1, wherein the instance allocation solution comprises an available area in which the instance is located, or an instance specification of the instance.

5. The method according to claim 1, wherein the step of generating the instance allocation solution comprises:

determining that the cloud computing resource pool cannot meet the instance allocation request; and notifying the tenant the instance allocation request cannot be met.

6. The method according to claim 5, wherein the step of notifying the tenant comprises:

generating adjustment solutions, wherein each adjustment solution indicates to adjust one or more parameters in the instance allocation request; and receiving an adjustment solution selected by the tenant.

7. The method according to claim 5, wherein the method further comprises:

notifying the tenant to adjust the instance allocation request; and generating the instance allocation solution based on an adjusted instance allocation request.

8. The method according to claim 1, wherein the method further comprises:

before the step of allocating the instance, receiving a task uploaded by the tenant; and storing the task in a storage resource in the cloud computing resource pool; and after allocating the instance, running the stored task on the instance.

9. The method according to claim 1, wherein the method further comprises:

determining whether the start time arrives; and when the start time arrives, starting the instance.

10. The method according to claim 1, wherein the method further comprises:

sending an estimated expense corresponding to the instance allocation solution to the tenant; and receiving a confirmation of the estimated expense corresponding to the instance allocation solution from the tenant.

11. A cloud computing management system comprising:

a memory storing executable instructions; and a processor configured to execute the executable instructions to:

receive an instance allocation request uploaded by a tenant, wherein the instance allocation request comprises a processor resource requirement and a deadline, wherein the processor resource requirement needs to be met and provided for the tenant before the deadline;

generate an instance allocation solution based on the instance allocation request, wherein the instance allocation solution comprises a life cycle of an instance allocated to the tenant, wherein the life cycle indicates a start time and a stop time of the instance;

sending the instance allocation solution to the tenant;

receiving acknowledgment of the tenant for the instance allocation solution; and allocates, based on the instance allocation solution, the instance to the tenant from a cloud computing resource pool managed by the cloud computing management system.

12. The system according to claim 11, wherein the processor resource requirement comprises a product of a quantity of processors and duration.

13. The system according to claim 11, wherein the instance allocation request further comprises an available area, a minimum quantity of synchronous running instances, or shortest valid running time, wherein the minimum quantity of synchronous running instances indicates a minimum quantity of instances that run simultaneously, the shortest valid running time indicates shortest running time of an instance each time.

14. The system according to claim 11, wherein the instance allocation solution comprises an available area in which the instance is located, or an instance specification of the instance.

15. The system according to claim 11, wherein the processor is configured to generate the instance allocation solution by:

determine that the cloud computing resource pool cannot meet the instance allocation request; and notifying the tenant the instance allocation request cannot be met.

16. The system according to claim 15, wherein the processor is configured to notify the tenant by:

generating adjustment solutions, wherein each adjustment solution indicates to adjust one or more parameters in the instance allocation request; and receiving an adjustment solution selected by the tenant.

17. The system according to claim 15, wherein the processor is configured to notify the tenant by:

notifying the tenant to adjust the instance allocation request; and generating the instance allocation solution based on an adjusted instance allocation request.

18. The system according to claim 15, wherein the processor is further configured to:

determine whether the start time arrives; and when the start time arrives, starts the instance.

19. The system according to claim 15, wherein the processor is further configured to:

send an estimated expense corresponding to the instance allocation solution to the tenant; and receive a confirmation of the estimated expense corresponding to the instance allocation solution from the tenant.

20. The system according to claim 11, further comprising an interface, wherein the processor is configured to:

prior to allocating the instance, receive via the interface a task uploaded by the tenant; and store the task in a storage resource in the cloud computing resource pool; and after allocating the instance, run the stored task on the instance.

* * * * *